United States Patent [19]

Lewis et al.

[11] 3,816,168

[45] June 11, 1974

[54] NITROCELLULOSE-MODIFIED URETHANE COATING COMPOSITIONS AND THEIR USE IN FINISHING LEATHER

[75] Inventors: Sheldon N. Lewis, Willow Grove; Matthew R. Yunaska, Warminster, both of Pa.

[73] Assignee: Rohm and Haas Company, Philadelphia, Pa.

[22] Filed: Apr. 2, 1973

[21] Appl. No.: 347,303

Related U.S. Application Data

[62] Division of Ser. No. 161,987, July 12, 1971, Pat. No. 3,763,061.

[52] U.S. Cl........ 117/142, 117/161 C, 117/161 KP, 117/166, 260/13, 260/16
[51] Int. Cl............................................. B44d 1/32
[58] Field of Search............. 260/13, 16; 117/161 C, 117/161 KP, 142

[56] References Cited
UNITED STATES PATENTS

| | | | |
|---|---|---|---|
| 3,245,827 | 4/1966 | Weber | 260/13 |
| 3,574,154 | 4/1971 | Shaw | 260/16 |

*Primary Examiner*—William H. Short
*Assistant Examiner*—Edward Woodberry
*Attorney, Agent, or Firm*—Terence P. Strobaugh

[57] ABSTRACT

Compositions comprising nitrocellulose and an isocyanate-terminated prepolymer of a polyisocyanate with an aliphatic polyol are useful as coating compositions, particularly in treating leather and leather substitutes.

3 Claims, No Drawings

NITROCELLULOSE-MODIFIED URETHANE COATING COMPOSITIONS AND THEIR USE IN FINISHING LEATHER

This is a division, of application Ser. No. 161,987, now U.S. Pat. No. 3,763,061, filed July 12, 1971.

This invention relates to improved nitrocellulose coating compositions, to their use in finishing leather and leather substitutes, and to leather and leather substitutes finished with the coating compositions.

Coating compositions comprising nitrocellulose are commonly used for finishing leather. However, many of the known compositions have been found to be deficient in certain properties. Since nitrocellulose is a hard polymer, many of the compositions containing it produce coatings which lack sufficient flexibility or elastic recovery, especially when used to coat relatively thick substrates. To overcome this problem, blends of nitrocellulose with various softer polymers have been used. However, while the treated leathers have increased flexibility, their wear properties, and especially their resistance to wet and dry abrasion, is greatly diminished. Thus, it would be desirable to have nitrocellulose blends which combine good flexibility with good wear properties.

It has now been found that coating compositions comprising (1) nitrocellulose and (2) an isocyanate-terminated prepolymer of an organic polyisocyanate with an aliphatic polyol provide finishing coats on leather and leather substitutes which have both good flexibility and good wear properties. Generally, the nitrocellulose will be present in the compositions in an amount of about 5% to about 65%, based on total solids in the composition, and preferably about 15% to about 45%.

The usual grades of commercial nitrocellulose can be used in the compositions. Generally, the nitrocellulose will have a degree of substitution of about 1.9 to 2.3, a degree of polymerization of about 100 to 400, and contain about 10 to 12% by weight nitrogen. Preferably, the nitrocellulose used in the compositions is free of water and butanol, so that nitrocellulose supplied in a dry or hydrocarbon wet form is advantageously employed. Particularly preferred is nitrocellulose of the type described in U.S. Pat. No. 3,284,253, of Enders et al., granted Nov. 8, 1966.

By aliphatic polyol is meant any aliphatic compound containing two or more free hydroxy groups. Substantially any of the wide variety of aliphatic polyols can be used in making the prepolymers of the compositions of the invention. Two classes of aliphatic polyols are preferred. The first class comprises those polyols usually referred to as polyetherols. Polyetherols are polyols which contain one or more chains of connected oxyalkylene groups and are prepared by the reaction of one or more alkylene oxides with simple aliphatic and alicyclic polyols. Examples of such polyetherols include polyethylene glycol, polypropylene glycol, polybutylene glycol, polyalkylene glycols containing a mixture of alkylene units, such as those prepared by reacting a mixture of ethylene oxide and propylene oxide with water, ethylene glycol, or propylene glycol, polyethertriols, such as those prepared by reacting alkylene oxides or mixtures of alkylene oxides with triols such as glycerin, trimethylol ethane, trimethylol propane, 1,2,6-hexanetriol, and the like, and polyethertetrols, such as those prepared by reacting alkylene oxides or mixtures of alkylene oxides with tetrols such as erythritol, pentaerythritol, and the like. The second preferred class of polyols comprises the simple low molecular weight polyols, generally having up to ten carbon atoms, such as mono-, di-, and triethylene glycols, mono-, di-, and tripropylene glycols, neopentyl glycol, glycerin, trimethylol ethane, trimethylol propane, 1,6-hexanediol, 1,2,6-hexanetriol, pentaerythritol, erythritol, and the like.

Generally, the polyol used in making the prepolymer will have a molecular weight of up to about 4000, and preferably up to about 3000 for a trifunctional polyol (a polyol having three free hydroxy groups) and up to about 2500 for a difunctional polyol (a polyol having two free hydroxy groups). For example, a preferred molecular weight range for a polyetherol having two free hydroxy groups is about 400 to about 2500 and for a polyetherol having three free hydroxy groups about 700 to about 3000. Mixtures of the above-described polyols can also be used.

By polyisocyanate is meant any compound containing two or more isocyanate groups.

Essentially any organic polyisocyanate can be used in making the prepolymers. Generally, the polyisocyanate will have up to 18 carbon atoms, exclusive of the isocyanate groups or isocyanate-derived groups, but polyisocyanates having more than 18 carbon atoms can be advantageously used. Examples of suitable polyisocyanates include aliphatic isocyanates, such as 1,6-hexamethylene diisocyanate, 1,8-octamethylene diisocyanate, 1,12-dodecamethylene diisocyanate, 2,2,4-trimethylhexamethylene diisocyanate, and similar alkylene diisocyanates, 3,3'-diisocyanatodipropyl ether, 1-isocyanato-3-isocyanatomethyl-3,5,5-trimethylcyclohexane, cyclopentylene-1,3-diisocyanate, cyclohexylene-1,4-diisocyanate, 4-methyl-1,3-diisocyanatocyclohexane, methyl 2,6-diisocyanatocaproate, and related isocyanates, bis(2-isocyanatoethyl)fumarate, trans-vinylene diisocyanate and similar unsaturated isocyanates, 4,4'-methylenebis(isocyanatocyclohexane), and related isocyanates, menthane diisocyanate, N,N',N''-tris(6-isocyanatohexamethylene)biuret, and related isocyanates, bis(2-isocyanatoethyl)carbonate, and similar carbonate diisocyanates, as well as other isocyanates derived from aliphatic polyamines, aromatic isocyanates such as tolylene diisocyanates, xylylene diisocyanates, dianisidine diisocyanate, 4,4'-diphenylmethane diisocyanate, 1-ethoxy-2,4-diisocyanatobenzene, 1-chloro-2,4-diisocyanatobenzene, tris(4-isocyanatophenyl)-methane, naphthalene diisocyanates, fluorene diisocyanates, 4,4'-biphenyl diisocyanate, phenylene diisocyanates, 3,3'-dimethyl-4,4'-biphenyl diisocyanate, p-isocyanatobenzyl isocyanate, tetrachloro-1,3-phenylene diisocyanate, and related isocyanates, 2,4,6-tribromo-1,3-phenylene diisocyanate, bis(2-isocyanatoethyl)benzene, alkylidene diisocyanates, such as 1,1-diisocyanatoethane, 1,1-diisocyanatobutane, ester isocyanates, such as diisocyanatoethyl adipate, 2-isocyanatoethyl 6-isocyanatocaproate, 2-isocyanatoethyl 3-isocyanatopropionate, and the like.

Other polyfunctional isocyanates which are useful in the compositions of the invention are disclosed in U.S. Pat. No. 3,162,664, of Brotherton et al., granted Dec. 22, 1964, U.S. Pat. No. 3,427,346, of Brotherton et al., granted Feb. 11, 1969, U.S. Pat. No. 3,275,679, of Brotherton et al., granted Sept. 27, 1966, U.S. Pat. No. 3,352,830, of Schmitt et al., granted Nov. 11, 1967, U.S. Pat. No. 2,729,666 of Stallmann, granted Jan. 3, 1956, U.S. Pat. No. 2,768,154 of Unruh et al., granted Oct. 23, 1956, U.S. Pat. No. 3,267,122 of Lehmann et al., granted Aug. 16, 1966, U.S. Pat. No. 3,281,378, of Garber et al., granted Oct. 25, 1966, U.S. Pat. No. 3,124,605, of Wagner, granted Mar. 10, 1964, U.S. Pat. No. 2,718,516, of Bortnick, granted Sept. 20, 1955, U.S. Pat. No. 3,468,934, of Emmons et al., granted Sept. 23, 1969, U.S. Pat. No. 3,567,763, of Emmons et al., granted Mar. 2, 1971, as well as isocyanates prepared from the amines disclosed in U.S. Pat. No. 3,256,318, of Brotherton et al., granted June 14, 1966.

The preparation of the isocyanate prepolymers useful in the compositions of the invention is well known in the art. The preparation of these prepolymers usually involves the reaction of a polyol with a diisocyanate or other polyisocyanate, preferably using an excess of the isocyanate to yield an isocyanate-terminated prepolymer product. Generally, the ratio of polyisocyanate to polyol used to make the prepolymers will be such that the ratio of isocyanate groups to hydroxy groups will be about 1.2 to about 2.5, and preferably about 1.3 to 2.25. In a typical preparation, the prepolymer is prepared by reacting the diisocyanate with a solution of the polyether in an inert organic solvent such as a lower alkyl ester of an alkanoic acid, a ketone, an aromatic hydrocarbon, such as xylene, benzene, toluene, a solvent naphtha, or mineral spirits, an aliphatic hydrocarbon, a chlorinated hydrocarbon, or a mixture of any of these solvents. The temperature of reaction can vary from room temperature up to 100°C. or higher. An extensive description of some of the useful techniques for preparing the isocyanate prepolymers can be found in J. H. Saunders and K. C. Frisch, *Polyurethanes: Chemistry and Technology*, Part II, Interscience (New York, 1964), especially on pages 8 to 49, and in the various references cited by Saunders and Frisch. Other preparative techniques which are known in the art can also be employed.

In a preferred embodiment of the invention, the prepolymer will have a molecular weight of up to about 6400, depending on the polyol and polyisocyanate from which it is derived. A prepolymer derived from a difunctional polyetherol will preferably have a molecular weight of about 700 to about 4300, while a prepolymer derived from a trifunctional polyetherol will preferably have a molecular weight of about 1200 to about 5200. The specific molecular weight of the final prepolymer can be chosen so as to impart the desired combination of use and aesthetic properties, such as abrasion resistance, flexibility, or the like to the treated substrate.

The coating compositions of the invention are generally formulated in an inert organic solvent. Solvents which are suitable for use in these compositions should be substantially free of active hydrogen atoms as determined by the Zerewitinoff method, described in Kohler et al., *J. Am. Chem. Soc.*, 40, 2181-8(1927), and should also be substantially anhydrous.

Included among the solvents that can be used are ketones, esters, aliphatic and aromatic hydrocarbons and chlorinated hydrocarbons, and the like. Examples of ketones include acetone, methyl ethyl ketone, methyl isopropyl ketone, diisobutyl ketone, methyl isobutyl ketone and ethyl isopropyl ketone. Examples of ethers include dioxane, diethyl ether, tetrahydrofuran and diisopropyl ether. Examples of esters include ethyl acetate, isopropyl acetate, butyl acetate, 2-ethoxyethyl acetate, 2-butoxyethyl acetate, ethyl propionate, and methyl butyrate. Examples of hydrocarbons include benzene, toluene, xylene, petroleum and solvent naphthas of aromatic character, hexane, octane, and decane. Chlorinated hydrocarbons include methylene chloride, ethylene dichloride, perchloroethylene, chloroform, bromoform, and carbon tetrachloride. Mixtures of these solvents can also be used. When formulated with an organic solvent, the coating compositions of the invention generally contain about 4% to about 40% by weight of solids, and preferably about 5 to about 25%.

The coating compositions of the invention can also contain a catalyst to promote curing. Any of the known isocyanate-curing catalysts can be used. Among these catalysts are dibutyltin dilaurate, dibutyltin dioctoate, 1,4-diazabicyclooctane, zinc octoate, stannous octoate, tertiary amines, such as trimethyl amine and triethylamine, and the like. The catalyst, when used, will generally be present in an amount of about 0.05% to about 2.5%, and preferably about 0.1% to about 1%, by weight based on the weight of total solids in the coating composition.

The coating compositions of the invention can be clear or can contain dulling agents, pigments, or dyes depending upon the particular use or aesthetic qualities which are desired. The purpose of these additives may be to color the coating or to deluster it. Examples of pigments which can be used include clay, titanium dioxide, calcium carbonate, blancfixe, finely divided metals such as aluminum, color lakes and tinctorial oxides. Other conventional additives which can be used include fillers, slip agents, lubricants, leveling agents, thickening agents, heat stabilizers, antioxidants, antiozonants, ultraviolet stabilizers, flame retardants, and dulling agents to soften the gloss. Suitable slip agents include silicones, waxes, and synthetic waxes.

When used in finishing leather, either as a basecoat, a topcoat, or other finishing coat, the compositions of the invention can be applied by any of the techniques well-known in the art, including brushing, swabbing, spraying, curtain coating (flow coating), or dip coating, onto the leather. Among the useful techniques are those described in U.S. Pat. Nos. 2,126,321 and 2,884,340. One or more coats can be applied as desired. The thickness of the coating can also be varied depending on the particular purposes that the coating is to serve. The amount of the composition applied on the leather or leather substitute varies widely with the type of material being coated and the ultimate finish desired. Generally, the composition is applied so as to provide a deposit on the leather of about 0.1 to about 8 mils dry film thickness and preferably about 0.3 to about 0.7 mils dry film thickness. After application, the coating can be cured by drying to a tack-free state at room temperature for about 30 minutes to one hour, or by heating at a temperature of up to about 100°C. until the desired degree of cure is effected.

The coating compositions of the invention are generally applied to the grain side of leather which as been tanned, fatliquored, and finished with an undercoating. The leather or leather substitute will also generally have been treated with an impregnant and, when the compositions are used as top coats, may have been subjected to a plating or other embossing process. The coating compositions of the invention can be applied to leather or a leather substitute which has previously been treated on the grain side with a cured synthetic polymer such as one of those described in U.S. Pat. Nos. 2,763,577; 3,066,997; and 3,103,447; as well as in Lowell et al., U.S. Pat. No. 3,441,365.

An advantage of the compositions of the present invention is that they deposit a coating which in the dry condition has outstanding elastic recovery and flexibility and yet is tough enough to be used as a wear layer when applied to leather or substitute leather in luggage or upholstery, and in garments such as shoes, jackets, and so forth. These characteristics of flexibility and elastic recovery make the coating compositions extremely valuable in the coating of thick flexible substrates, and particularly those having a thickness of 30 mils to 100 mils or higher, which are subjected to severe bending action, for example, in the coating of leather or substitute leather used in luggage, upholstery, shoes and other garments.

The coating compositions of the present invention can also be used to provide decorative or protective coatings on all sorts of other substrates including paper, wood, textiles, plastic films such as polyvinyl chloride, polyethylene, polypropylene, polyethylene terephthalate, rigid and flexible foams, nylon, metals and metal foils such as aluminum, or laminated structures comprising layers of the various materials mentioned.

The following examples will further illustrate the invention but are not intended to limit it in any way. All parts and percentages are by weight unless otherwise noted.

EXAMPLE 1

This example shows the preparation of a typical prepolymer used in the compositions of the invention.

A prepolymer is prepared by reacting 100 parts of a 1,2-propylene oxide reaction product of trimethylolpropane, having a molecular weight of approximately 400 with 216 parts of 4,4'-methylene-bis(isocyanatocyclohexane) in 316 parts of toluene. The reaction product can be isolated from the solution or directly formulated with nitrocellulose in solution.

Following this procedure using other polyols and isocyanates, similar prepolymers of the invention are prepared.

EXAMPLE 2

Leather which has been previously treated with a base coat composition is topcoated with various urethane prepolymers and nitrocellulose-modified urethane prepolymers. The treated leather is then evaluated by the following tests:

1. WATER RESISTANCE

Leather which has been immersed in tap water for ½ hour is subjected to abrasion on a Multech Wet Crock Meter (available from Milwaukee School of Engineering, Milwaukee, Wisconsin). Typical ratings estimate % of finish area damaged as function of number of abrasion cycles with four pound weight. Relative resistance to wet crocking can also be evaluated by hand rubbing the treated leather with a wet cloth.

2. BALLY FLEXIBILITY

Refer to Test Method LP-14, entitled "The Measurement of the Flexing Endurance of Light Leathers and their Surface Finishes", as described in "Official Methods of Analysis, 1965", of Society of Leather Trades Chemists.

3. DOUBLE BEND FLEXIBILITY

Leather is folded sharply by hand once, then the folded piece is folded sharply by hand once more perpendicular to the first fold. Cracks in the finish after the first and/or second fold are used to determine extensibility of the finish. When leather cracking obscures finish cracking, the test is disregarded.

4. EDGE WEAR

A finished sample 1 inch in width is clamped over a ¾ inch diameter rod and the assembly is weighted with a 2 pound weight. The sample is abraded reciprocally in a 10-inch path against unused No. 10 cotton duck which is pulled taut against a smooth glass plate. The degree of damage to the finish is subjectively evaluated after 1500 cycles.

Finishing compositions are evaluated containing various proportions of nitrocellulose and the following prepolymers:
- A. a prepolymer of an adduct of trimethylol propane and propylene oxide having an average molecular weight of about 1540 and toluene diisocyanate.
- B. a prepolymer of an adduct of trimethylol propane and propylene oxide having an average molecular weight of about 740 and toluene diisocyanate.
- C. a prepolymer of an adduct of trimethylol propane and propylene oxide having an average molecular weight of about 2540 and toluene diisocyanate.
- D. a prepolymer of a polypropylene glycol diol having an average molecular weight of about 400 and toluene diisocyanate.
- E. A prepolymer of a polypropylene glycol diol having an average molecular weight of about 700 and toluene diisocyanate.
- F. a prepolymer of a polypropylene glycol diol having an average molecular weight of about 1010 and toluene diisocyanate.
- G. a prepolymer of a polypropylene glycol diol having an average molecular weight of about 2010 and toluene diisocyanate.

The prepolymers are prepared with an NCO/OH ratio of 1.8 to 1.

Each of the finishing compositions is formulated at 15% by weight total solids in xylene/butyl acetate/cellosolve acetate and sprayed onto basecoated leather to give a dry film coverage of about 1.5 grams per square foot. After being cured by heating at about 120°F. for 15 to 20 minutes, the finished leather is evaluated using one or more of the tests described above.

Table I summarizes the results of these tests.

TABLE I

| Prepolymer and % | | Nitrocellulose % | Water Resistance | Bally Flexibility | Double Bend Flexibility | Edge Wear |
|---|---|---|---|---|---|---|
| A | 80 | 20 | OK | none-slight | OK | very slight |
| A | 75 | 25 | OK | slight | OK | slight |
| A | 70 | 30 | OK | moderate | OK | slight |
| B | 80 | 20 | OK | poor | poor | slight |
| B | 70 | 30 | OK | poor | poor | slight |
| C | 70 | 30 | OK | slight | OK | moderate |
| C | 60 | 40 | OK | bad | OK | bad |
| D | 70 | 30 | OK | bad | OK | bad |
| E | 70 | 30 | OK | slight-moderate | OK | moderate |
| F | 70 | 30 | OK | slight | OK | bad |
| F | 65 | 35 | OK | moderate | OK | bad |
| G | 70 | 30 | OK | moderate | OK | bad |
| G | 55 | 45 | OK | moderate | OK | bad |

The above data demonstrates the usefulness of the coating compositions of the invention in finishing leather, and particularly the ability to vary the make-up of these compositions to achieve different combinations of use properties.

EXAMPLE 3

Prepolymers similar to A through G of Example 2 are prepared using 4,4'-methylene-bis(isocyanatocyclohexane), 4,4'-methylene-bis(isocyanatobenzene), N,N',N''-tris(6-isocyanatohexamethylene)biuret, 1-isocyanato-3-isocyanatomethyl-3,5,5-trimethylcyclohexane, and 2-isocyanatoethyl 6-isocyanatocaproate, and when formulated in coating compositions with nitrocellulose and applied to leather provide useful finishing coats. When other isocyanates are used, similar useful coating compositions are obtained.

EXAMPLE 4

Prepolymers similar to those described in Example 2 and Example 4 are prepared using polypropylene glycol and polybutylene glycol of various average molecular weight, alkylene glycol adducts of trimethylol ethane, 1,2,6-hexanetriol, erythritol, and pentaerythritol having various average molecular weights, ethylene glycol, diethylene glycol, Triethylene glycol, propylene glycol, dipropylene glycol, tripropylene glycol, neopentyl glycol, glycerin, trimethylol propane, trimethylol ethane, 1,6-hexanediol, 1,2,6-hexanetriol, erythritol, and pentaerythritol, and when formulated in coating compositions and applied to leather provide useful finishing coats. Prepolymers from other aliphatic polyols provide similar useful coating compositions.

EXAMPLE 5

A leather substitute, such as that available under the trademark Corfam, is finished with the coating compositions of Examples 2 to 4, and found to possess useful properties.

Similar results are obtained in coating other substrates such as metal, wood, paper, plastic, and the like.

It is to be understood that changes and variations may be made without departing from the spirit and scope of the inveniton as defined by the appended claims.

We claim:

1. A method of finishing leather or a leather substitute which comprises applying to the leather or leather substitute a composition consisting essentially of about 5–65% by weight of nitrocellulose based on total solids content of the composition and about 95 to about 35% by weight of total solids of an isocyanate-terminated prepolymer of an organic polyisocyanate with an aliphatic polyol and then drying the coated leather or leather substitute.

2. A method according to claim 1 wherein the composition is applied so as to provide a deposit on the leather or leather substitute of about 0.1 to about 8 mils dry film thickness.

3. A method according to claim 1 wherein drying is carried out at room temperature to about 100°C.

* * * * *